(12) United States Patent
Leow et al.

(10) Patent No.: US 7,554,989 B2
(45) Date of Patent: Jun. 30, 2009

(54) REAL TIME OPTIMIZATION OVER A SHARED COMMUNICATION CHANNEL

(75) Inventors: Siew Kiat Leow, Singapore (SG); Song Gee Lim, Singapore (SG); Eng Yeow Cheu, Singapore (SG)

(73) Assignee: Creative Technology Ltd., Singapore (SG)

( * ) Notice: Subject to any disclaimer, the term of this patent is extended or adjusted under 35 U.S.C. 154(b) by 490 days.

(21) Appl. No.: 11/038,703

(22) Filed: Jan. 18, 2005

(65) Prior Publication Data
US 2006/0159126 A1    Jul. 20, 2006

(51) Int. Cl.
H04L 12/56    (2006.01)
(52) U.S. Cl. .................... 370/395.4; 370/468
(58) Field of Classification Search ............. 370/265, 370/349, 395.42, 468, 537, 401; 375/242–248; 704/219–221, 203; 707/101; 709/219
See application file for complete search history.

(56) References Cited

U.S. PATENT DOCUMENTS

| | | | |
|---|---|---|---|
| 5,251,209 A | 10/1993 | Jurkevich | |
| 5,253,058 A | 10/1993 | Gharavi | |
| 5,434,913 A | 7/1995 | Tung | |
| 5,463,624 A * | 10/1995 | Hogg et al. ................ | 370/461 |
| 5,819,215 A | 10/1998 | Dobson | |
| 5,835,495 A | 11/1998 | Ferriere | |
| 5,982,817 A * | 11/1999 | Wuppermann ............. | 375/244 |
| 6,182,031 B1 | 1/2001 | Kidder | |
| 6,345,056 B1 | 2/2002 | Bharucha | |
| 6,502,069 B1 * | 12/2002 | Grill et al. ................. | 704/219 |
| 6,574,193 B1 | 6/2003 | Kinrot | |
| 6,574,769 B1 | 6/2003 | Ramaswamy | |
| 2003/0106063 A1 * | 6/2003 | Guedalia ..................... | 725/90 |
| 2004/0228320 A1 * | 11/2004 | Laroia et al. ............... | 370/349 |
| 2005/0232608 A1 * | 10/2005 | Tanner ....................... | 386/125 |

FOREIGN PATENT DOCUMENTS

WO    03104935 A2    12/2003

* cited by examiner

*Primary Examiner*—Chirag G Shah
*Assistant Examiner*—Yong Zhou
(74) *Attorney, Agent, or Firm*—Creative Technology Ltd.

(57) ABSTRACT

There is provided a method and apparatus for sending an encoded signal between a host station and a client station in which the host station encodes data, encodes the error data resulting from that encoding process and generates user data. Thus, the host station generates three types of data and it accords different priorities to those three data types. The first type of data, the encoded original data is accorded the highest priority and is guaranteed delivery to a client station. Thus, a minimum signal quality is guaranteed at the client end. The second type of data, user data, is accorded a lower priority and will be delivered to the client station if there is available bandwidth once the encoded original data has been successfully delivered. The third type of data, encoded error data is accorded the lowest priority and is only delivered to the client station if there is available bandwidth once the encoded original data and the user data have been delivered. A minimum signal quality is ensured with enhancement allowed if possible. The receiving client station(s) may or may not be capable of decoding the error data and the quality at a particular client station will depend on whether it does so or not.

17 Claims, 2 Drawing Sheets

REAL TIME OPTIMIZATION OVER A SHARED COMMUNICATION CHANNEL

FIELD OF THE INVENTION

The invention relates to the field of encoded signal transmission. In particular, the invention relates to a method and apparatus for sending an encoded audio signal between a host station and a client station.

BACKGROUND OF THE INVENTION

Encoding data is a well known process to make more efficient use of a given bandwidth. An input signal (analogue or digital) is coded as a digital signal that occupies less bandwidth than the original signal. An encoder at the transmitting end encodes the original signal, the encoded signal is then sent across the channel and a decoder at the receiving end receives the encoded signal, decodes it and reconstructs the original signal.

The quality of the reconstructed signal will depend on a number of factors including the complexity of the encoding and decoding system and the available bandwidth for transmission of the encoded signal. For audio signals, a user may well observe audio breakages especially when he is simultaneously sending user data in the opposite direction or, for video signals, a user may observe video breakages in a similar way. This is particularly the case for wireless terminals relying on radio frequency (RF) signals emitted from a host station, as the environment may be quite volatile and the conditions can be constantly changing as the user moves from place to place.

SUMMARY OF THE INVENTION

In general terms, the invention proposes that a host station encode data, encode the error data resulting from that encoding process and generate user data.

Thus, the host station generates three types of data and it accords different priorities to those three data types. The first type of data, the encoded data is accorded the highest priority and is guaranteed delivery to a client station. Thus, a minimum signal quality is guaranteed at the client end. The second type of data, user data, is accorded a lower priority and will be delivered to the client station if there is available bandwidth once the encoded data has been successfully delivered. The third type of data, encoded error data is accorded the lowest priority and is only delivered to the client station if there is available bandwidth once the encoded data and the user data have been delivered.

Thus, a minimum signal quality is ensured with enhancement allowed if possible. The receiving client station(s) may or may not be capable of decoding the error data and the signal quality at a particular client station will depend on whether it does so or not.

More specifically, according to the invention there is provided a method for sending an encoded signal from a host station to a client station, the method comprising the steps of:
a) encoding data to generate encoded data A and error data;
b) optionally generating user data B;
c) encoding the error data to generate encoded error data C;
d) transmitting the encoded data A;
e) if there is user data B and available bandwidth, transmitting user data B; and
f) if there is available bandwidth, transmitting encoded error data C.

According to the invention, there is also provided a method for receiving an encoded signal from a host station at a client station, the method comprising the steps of:
a) receiving encoded data A, user data B and encoded error data C;
b) processing the user data B;
c) decoding the encoded data A to generate decoded data;
d) decoding the encoded error data C to generate decoded error data; and generating the signal from the decoded data and the decoded error data.

According to the invention, there is also provided a method for sending an encoded audio signal from a host station to a client station, the method comprising the steps of:
a) encoding audio data to generate encoded audio data A and error data;
b) optionally generating user data B;
c) encoding the error data to generate encoded error data C;
d) transmitting the encoded audio data A;
e) if there is user data B and available bandwidth, transmitting user data B; and
f) if there is available bandwidth, transmitting encoded error data C.

When an encoding process is performed on the audio data, encoded audio data A is produced. Associated with that encoded audio data A is some error data. The amount of error data produced will depend on a number of factors including the particular encoding process used. If that error data is taken into account when the audio signal is reconstructed at the decoder end, the reconstructed audio signal will be highly accurate i.e. the audio quality will be high. If none of the error data is taken into account, the audio quality will be lower. The audio quality will be somewhere between the two extremes if some, but not all, the error data is taken into account when the audio signal is reconstructed at the decoder end.

The encoded audio data A is accorded the highest priority and the encoded error data C is accorded the lowest priority. The encoded audio data A alone will provide a minimum quality of audio at the client station. Encoded error data C, in addition, will improve the audio quality. Encoded audio data A is guaranteed delivery whereas some or all of the error data C may be discarded if there is not available bandwidth. User data B is accorded a priority lower than the encoded audio data A but higher than the encoded error data C. If there is not available bandwidth to deliver user data B once encoded audio data A has been delivered, the user data B will be delivered on the next available cycle. Thus, the available bandwidth is used efficiently.

In an embodiment of the invention, the user data B is generated in response to a client request received at the host station from the client station. In that case, the client request may comprise a request from the client station for a re-send of the encoded audio data A.

Steps d), e) and f) of transmitting may comprise transmitting over a wireless communication channel. This may be the case if the host station and the client station are part of a wireless network. In that case, the transmission may be at radio frequency (RF) which is often used in wireless networks.

The method may make use of a bus arbitration mechanism to establish if there is available bandwidth. In that case, a time slot will be allocated to the host station and step d) will be performed i.e. the encoded audio data A will be transmitted. If there is available time remaining on the bus, step e) will be performed i.e. any user data B will be transmitted. If there is available time remaining on the bus, step f) will be performed i.e. encoded error data C will be transmitted.

According to the invention, there is also provided a method for receiving an encoded audio signal from a host station at a client station, the method comprising the steps of:
- a) receiving encoded audio data A, user data B and encoded error data C;
- b) processing the user data B;
- c) decoding the encoded audio data A to generate decoded audio data;
- d) decoding the encoded error data C to generate decoded error data; and
- e) generating the audio signal from the decoded audio data and the decoded error data.

The method may further comprise the step of sending a client request from the client station to the host station. The client request may comprise a request from the client station for a re-send of the encoded audio data A. User data B may be generated by the host station in response to a client request sent by the client station.

The encoded error data received may or may not be all the encoded error data associated with the encoded audio data A. The more encoded error data C which is received and decoded, the more decoded error data can be used, alongside the decoded audio data, to generate the audio signal. More decoded error data will result in a higher quality audio signal.

Step a) of receiving may comprise receiving over a wireless communication channel. This may be the case if the host station and the client station are part of a wireless network. In that case, the transmission may be at RF which is often used in wireless networks.

According to the invention, there is also provided a method for encoding an audio signal comprising the steps of:
- a) encoding audio data to generate encoded audio data and error data;
- b) encoding the error data to generate encoded error data; and
- c) assigning delivery priorities to the encoded audio data and the encoded error data, the delivery priority of the encoded audio data being higher than the delivery priority of the encoded error data.

With this arrangement, the encoded audio data may be guaranteed delivery to a client station so as to ensure at least a minimum audio quality at the client station. The encoded error data may be delivered to the client station only if there is available bandwidth. Otherwise, some or all of the encoded error data may be discarded. The more encoded error data that is delivered to the client station (and processed at the client station to generate the reconstructed audio signal), the higher the audio quality at the client station.

According to the invention, there is further provided a method for sending an audio signal between a host station and a client station, the method comprising the steps of:
- a) the host station encoding audio data to generate encoded audio data A and error data;
- b) the host station optionally generating user data B;
- c) the host station encoding the error data to generate encoded error data C;
- d) the host station transmitting the encoded audio data A;
- e) if there is user data B and available bandwidth, the host station transmitting user data B;
- f) if there is available bandwidth, the host station transmitting the encoded error data C;
- g) the client station receiving the encoded audio data A and the user data B;
- h) the client station processing the user data B;
- i) the client station decoding the encoded audio data A to generate decoded audio data;
- j) the client station generating the audio signal from the decoded audio data.

In this arrangement, encoded audio data A is guaranteed transmission whereas encoded error data C is transmitted only if there is available bandwidth. The client station uses only the encoded audio data A to generate the audio signal, resulting in an audio signal of only minimum quality.

In one advantageous embodiment, the method further comprises the step of the client station receiving the encoded error data C. In that case, the method may further comprise the step of the client station decoding the encoded error data C to generate decoded error data. The step of the client station generating the audio signal may comprise the client station generating the audio signal from the decoded audio data and the decoded error data. In that embodiment, the client station additionally uses some or all of the encoded error data C associated with the encoded audio data A to generate the audio signal, thereby resulting in an improved audio quality at the client station.

According to the invention, there is provided a host station for sending an encoded audio signal to a client station, the host station comprising:
- a first encoder for encoding audio data, the first encoder being arranged to generate encoded audio data A and error data;
- a processor for generating user data B;
- a second encoder for encoding the error data, the second encoder being arranged to generate encoded error data C; and
- a transmitter arranged:
  - a) to transmit encoded audio data A; then
  - b) if there is user data B and available bandwidth, to transmit user data B; then
  - c) if there is available bandwidth, to transmit encoded error data C.

Thus, the host station is arranged to transmit the encoded audio data A and then, only if there is available bandwidth to transmit any user data B and then, only if there is available bandwidth, to transmit encoded error data C. The audio signal may be reconstructed from only the encoded audio data A; this will provide a minimum audio quality. Additionally, encoded error data C may be used to reconstruct the audio signal; this will improve the audio quality.

The first and second encoders may be part of a single encoder arranged to encode audio data and also to encode the error data resulting from that encoding process.

The host station may make use of a bus arbitration mechanism to establish if there is available bandwidth. In that case, a time slot will be allocated to the host station. Step d) will be performed i.e. the encoded audio data A will be transmitted. If there is available time remaining on the bus, step e) will be performed i.e. any user data B will be transmitted. If there is available time remaining on the bus, step f) will be performed i.e. encoded error data C will be transmitted.

The processor may be arranged to generate user data B in response to a client request received at the host station from the client station. In that case, the host station may further comprise a receiver for receiving client requests from the client station. The client request may comprise a request from the client station for a re-send of the encoded audio data A.

In an embodiment of the invention, the transmitter is arranged to transmit over a wireless communication channel. This is particularly useful where the host station is arranged to be part of a wireless network. In that case, the transmission may take place at RF.

According to the invention, there is also provided a client station for receiving an encoded audio signal from a host station, the client station comprising:
- a receiver arranged to receive encoded audio data A, user data B and encoded error data C;
- a processor for processing the user data B;
- a first decoder for decoding the encoded audio data A, the first decoder being arranged to generate decoded audio data; and
- a second decoder for decoding the encoded error data C, the second decoder being arranged to generate decoded error data; and
- a generator arranged to generate the audio signal from the decoded audio data and the decoded error data.

The first and second decoders may be part of a single decoder arranged to decode the encoded audio data A and also to decode the encoded error data C.

The client station may further comprise a transmitter for transmitting client requests to the host station. Those client requests may include requests for a re-send of the encoded audio data A.

In an embodiment of the invention, the receiver (and transmitter if there is one) is/are arranged to receive over a wireless communication channel. This is particularly useful where the client station is arranged to be part of a wireless network.

According to the invention, there is also provided apparatus for sending an encoded audio signal between a host station and a client station comprising a host station as described above and at least one client as described above.

According to the invention, there is also provided apparatus for transmitting and receiving encoded audio signals, the apparatus comprising a host station for sending an encoded audio signal to a client station and a client station for receiving the encoded audio signal from the host station, the host station comprising:
- a first encoder for encoding audio data, the first encoder being arranged to generate encoded audio data A and error data;
- a processor for generating user data B;
- a second encoder for encoding the error data, the second encoder being arranged to generate encoded error data C; and
- a transmitter arranged:
  - to transmit encoded audio data A; then
  - if there is user data B and available bandwidth, to transmit user data B; then
  - if there is available bandwidth, to transmit encoded error data C; and the client station comprising:
- a receiver arranged to receive the encoded audio data A and any user data B;
- a processor for processing the user data B;
- a decoder for decoding the encoded audio data A, the decoder being arranged to generate decoded audio data; and
- a generator arranged to generate the audio signal from the decoded audio data.

In this apparatus, encoded audio data A is guaranteed transmission from the host station whereas encoded error data C is transmitted only if there is available bandwidth. The client station uses only the encoded audio data A to generate the audio signal, resulting in an audio signal of only minimum quality.

In an advantageous embodiment of the invention, the client station receiver is arranged to receive the encoded error data C. In that embodiment, the client station may further comprise a second decoder for decoding the encoded error data C, the second decoder being arranged to generate decoded error data. In that embodiment, the client station generator is preferably arranged to generate the audio signal from the decoded audio data and the decoded error data. In that embodiment, the client station uses the encoded error data C in addition to the encoded audio data A to generate the audio signal, thereby improving the audio quality.

According to the invention, there is also provided a method for sending an encoded video signal from a host station to a client station, the method comprising the steps of:
- a) encoding video data to generate encoded video data A and error data;
- b) optionally generating user data B;
- c) encoding the error data to generate encoded error data C;
- d) transmitting the encoded video data A;
- e) if there is user data B and available bandwidth, transmitting user data B; and
- f) if there is available bandwidth, transmitting encoded error data C.

According to the invention, there is also provided a method for receiving an encoded video signal from a host station at a client station, the method comprising the steps of:
- a) receiving encoded video data A, user data B and encoded error data C;
- b) processing the user data B;
- c) decoding the encoded video data A to generate decoded video data;
- d) decoding the encoded error data C to generate decoded error data; and generating the video signal from the decoded video data and the decoded error data.

When an encoding process is performed on the video data, encoded video data A is produced. Associated with that encoded video data A is some error data. The amount of error data produced will depend on a number of factors including the particular encoding process used. If that error data is taken into account when the video signal is reconstructed at the decoder end, the reconstructed video signal will be highly accurate i.e. the video quality will be high. If none of the error data is taken into account, the color information of the video signal will be reduced. The color will be enhanced if some, but not all, the error data is taken into account when the video signal is reconstructed at the decoder end.

The encoded video data A is accorded the highest priority and the encoded error data C is accorded the lowest priority. The encoded video data A alone will provide a minimum quality of video (with reduced color information) at the client station. Encoded error data C, in addition, will improve the audio video quality i.e. enhance the color. Encoded video data A is guaranteed delivery whereas some or all of the error data C may be discarded if there is not available bandwidth. User data B is accorded a priority lower than the encoded video data A but higher than the encoded error data C. If there is not available bandwidth to deliver user data B, once encoded video data A has been delivered, the user data B will be delivered on the next available cycle. Thus, the available bandwidth is used efficiently.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, of which.

DETAILED DESCRIPTION OF THE PREFERRED EMBODIMENT

In the described embodiment, we consider a host station in the form of a server station and a plurality of client stations in the form of wireless client terminals. The server station is arranged to send encoded audio data, user data and encoded error data to the client terminals by RF and to receive requests from client terminals by RF. The client terminals are arranged to receive encoded audio data, user data and encoded error data from the server station by RF and to send client requests by RF to the server station.

Figure 1:
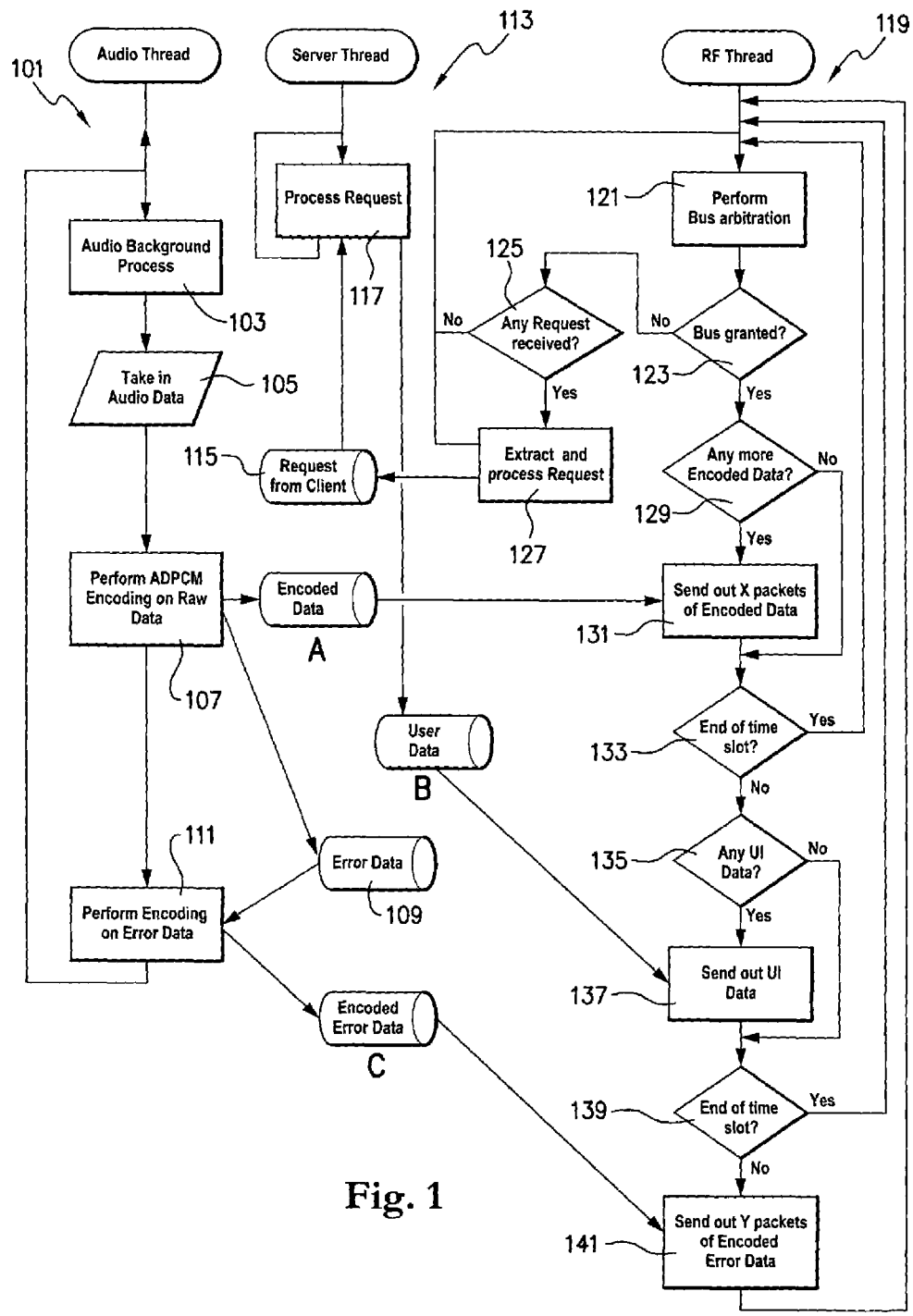
FIG. 1 is a flow chart showing the operational steps at a host station.
Figure 2:
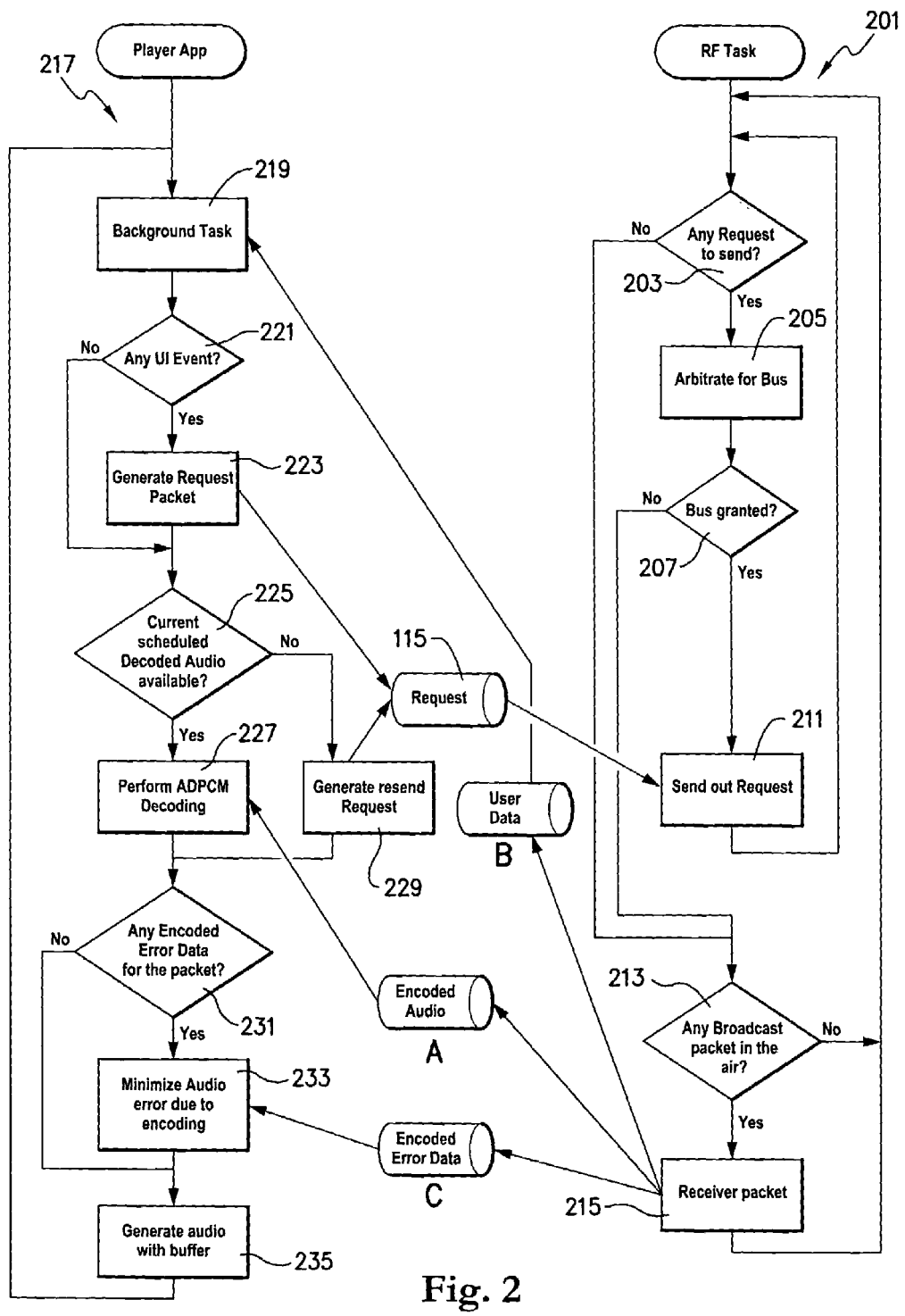
FIG. 2 is a flow chart showing the operational steps at a client station.

FIG. 1 is a flow chart showing operation at the server station. FIG. 2 is a flow chart showing operation at a given client terminal.

The flow chart of FIG. 1 is divided into three threads, showing the different aspects of operation. The first thread 101 is the audio thread. This part of the flow chart shows the processes performed by the server on the audio data. The second thread 113 is the server thread. This part of the flow chart shows the server operating steps. The third thread 117 is the RF thread. This part of the flow chart shows the steps performed by the server station to send out data by RF to a client terminal.

Firstly, consider the audio thread 101. At first step 103, audio background processes are performed by the server. Those background processes may include getting audio data from local storage and processing it, for example reading MP3 file from a local hard disk, decoding it into PCM samples and applying sound enhancement processes to the PCM samples.

At a second step 105, the original audio data is taken in by the server. This step 105 essentially involves taking in the audio data which is to be sent out and storing it in some form of buffer, when space is available. At third step 107, encoding is performed on the raw audio data to generate encoded data A and error data 109. At fourth step 111, encoding is performed on the error data 109 to generate encoded error data C.

The particular form of encoding may be any one of a number of known encoding algorithms and does not form part of the invention. However, one possible encoding technique is 4:1 ADPCM for the raw audio data. The ADPCM encoding error can be coded into 2 bits with resolution of ¼ the ADPCM lookup table resolution. An additional algorithm may be applied to further optimize bandwidth usage by sending encoded error data only when error is high.

Secondly, consider the server thread 113. The server deals with requests 115 from client terminals (which will be discussed in more detail with reference to FIG. 2) and processes those requests (step 117) to generate user data B.

Thirdly, consider RF thread 119. At step 121, bus arbitration is performed. The bus arbitration mechanism allows the allocation of time slots to the server and to the client terminals for data transfer. The next steps will depend on whether a time slot on the bus is available (question 123).

If, on the one hand, a time slot on the bus is not available, the system will look to see if any client requests have been received from the client terminals (question 125). If client requests have been received, the requests will be extracted and processed (step 127) to generate requests 115, which will be processed and dealt with by the server as described above. Then, operation will return to the first step once again i.e. step 121 of bus arbitration. If no client requests have been received, operation will return immediately to the first step.

If, on the other hand, a time slot is available, the server station looks to see if there is any encoded audio data A (from audio thread 101, described above) to send out to client terminals (question 129). If there is encoded data to send, at step 131, the server will send out x packets of encoded data A. Once the encoded data has been sent successfully, the server will look to see if there is any more available time allocated on the bus (question 133).

If the time slot has come to an end, operation will return to the first step once more i.e. the server will perform bus arbitration once again to check for an available time slot. Otherwise, the system looks to see if there is any user data B (from server thread 113, described above) to send out to client terminals (question 135). If there is user data to send, at step 137, the server will send out the user data. Once the user data has been sent successfully, the server will look to see if there is any more available time allocated on the bus (question 139).

If the time slot has come to an end, operation will return to the first step once more i.e. the server will perform bus arbitration again. Otherwise, the system will send out y packets of encoded error data C (from audio thread 101, described above) at step 141.

Now consider the flow chart of FIG. 2 which shows operation at one of the client terminals. The flow chart of FIG. 2 is divided into two threads, showing the different aspects of operation. One thread 217 is the player application thread. This part of the flow chart shows operation within the client terminal to deal with the audio data. The other thread 201 is the RF thread. This part of the flow chart shows the steps performed by the client terminal to send data to and receive data from the server station.

Firstly, consider the RF thread 201. At question 203, the client terminal asks whether there is any client request to send to the server station. The client requests will be described in more detail below. If there is no client request to send, operation moves directly to step 213 described below. If there is a request to send, the client terminal performs bus arbitration (step 205) i.e. the client terminal checks to see if there is bandwidth available on the bus for sending data. At question 207, if, on the one hand, there is no bandwidth available on the bus, operation moves directly to step 213 described below. If, on the other hand, there is available bandwidth, the client terminal sends out a request (step 211).

At step 213 the client terminal checks to see if there are any packets broadcast from the server station to be received by the client terminal. If not, operation returns to the start of the RF thread. If there are packets to be received, the client terminal receives the packets (step 215) of encoded audio data A, user data B and encoded error data C sent from the server station. Then, operation returns to the start of the RF thread 201 once again.

Now, consider the player application thread 217. At first step 219, background tasks are performed by the client terminal. Those background processes may include, for example, displaying, to the user, user data received from the server and providing a menu for user interaction. At a second step 221, the client terminal considers whether there are any user events i.e. client requests to send out to the server station. If there are user events, user data B is received and/or request packets are generated (at step 223). The request packets are then sent out to the server station as described above. If there are no user events, operation proceeds directly to step 225.

At step 225, the client terminal looks for encoded audio data A sent from the server station and received by the client terminal as described above. The client terminal then either decodes the encoded audio data A (step 227) or requests a re-send of audio data (step 229) with a client request sent out as described above.

Then, at step 231, the client terminal looks to see if there is any encoded error data C. If there is encoded error data, the client terminal decodes the error data C (step 233) thereby minimizing the audio error and improving the audio quality. Then at step 235, the client terminal generates the original audio signal. If there is no encoded audio data C, the client terminal generates the original audio signal without the encoded error data thereby resulting in a lower quality audio signal. As will be discussed below, a given client terminal may have the capability to receive and decode the encoded error data C or may not have the capability i.e. steps 231 and 233 may or may not be performed in a particular client terminal.

Referring once again to FIG. 1, it can be seen that the various types of data are allocated different priorities. The high priority (low-fidelity) data is the encoded audio data A itself. This data is guaranteed delivery so that a basic quality of audio can always be received by the client terminal. Only, when the encoded data has been successfully sent does the server station look to see if there is available time on the bus for further data to be sent.

The next priority data is the user data B. The user data is sent from the server station to the client terminal in response to a client request. The client requests may include a request generated automatically by the client terminal for a re-send of the original encoded audio data or another request either generated automatically by the client terminal or generated by a user. One such request may be a request for service/information from the server station to fulfill the need for a user interface. Some other requests sent from the client to the server include a request for attributes (e.g. name, artist, genre) for a given song, a request for a song list for a given attribute, a request for a change in the mechanism for sending the audio data (e.g. the period of sending or the size of each audio data packet) and a request for the status of the host such as the available storage. Only when the user data has been successfully sent does the server station look to see if there is available time on the bus for further data to be sent.

The advantage of this priority allocation is that, even when the client terminal is sending requests to the server station, a minimum quality of audio is still guaranteed since the encoded audio data is guaranteed delivery and has a higher priority than the user data.

The lowest priority (high-fidelity) data is the encoded error data C. If there is available bandwidth, the encoded error data C will be sent. If there is not available bandwidth, packets of encoded error data will be thrown away. The encoded error data improves the sound quality of received data but is not necessary for the minimum audio quality which is guaranteed by the delivery of the encoded audio data A.

The process described makes the most efficient use of the available bandwidth. Low fidelity data (i.e. the encoded audio data A) is guaranteed delivery while high fidelity data (i.e. the encoded error data C) will be delivered only when there is available bandwidth. The process also allows for different classes of receiving devices with varying decoding capabilities. Higher end devices which can handle more CPU intensive and memory consuming decoding processes can receive both the encoded audio data A and the encoded error data C, resulting in a high quality reconstructed audio signal at the client end. Lower end devices which can only deal with decoding taking up little power and memory space receive only the low fidelity data so as to obtain only the minimum quality audio signal at the client end.

The embodiment described concerns RF devices and the invention is especially useful for those devices as the environment may be rather volatile and the conditions may change as a user moves from place to place. In that situation, the process helps to provide a minimum audio quality and to allow enhancement if possible. Also, user activities also make use of RF bandwidth and this invention provides an ideal optimization of usage of the available bandwidth by allowing user activities to take higher priority over high fidelity data. Thus, the user will be able to experience faster responses and will not experience irritating audio breakages. However, it should be understood that the invention is not limited to RF devices.

In addition, the described embodiment describes the transmission of audio data, but it should be understood that the invention is not limited to audio data only.

While the preferred embodiment of the invention has been illustrated and described, it will be appreciated that various changes can be made therein without departing from the spirit and scope of the invention as defined by the appended claims.

We claim:

1. A method for sending an encoded signal from a host station to a client station, the encoded signal including different types of data that are accorded different priorities, the method comprising the steps of:
   a) encoding data to generate encoded data A;
   b) generating user data B if a client request is received from the client station and according encoded data A a higher priority than user data B;
   c) encoding error data resulting from encoding data to generate encoded error data C and according user data B a higher priority than error data C;
   d) transmitting the encoded data A;
   e) if there is user data B and available bandwidth, transmitting user data B; and
   f) if there is available bandwidth, transmitting encoded error data C.

2. The method of claim 1, wherein the error data results only from encoding data.

3. A method for receiving an encoded signal from a host station at a client station, the encoded signal including different types of data that are accorded different priorities, the method comprising the steps of:
   a) sending a client request for generating user data B if there is available bandwidth;
   b) receiving encoded data A which is accorded a higher priority over user data B;
   c) receiving and processing user data B if there is user data B and available bandwidth, user data B being accorded a higher priority than error data C;
   d) receiving encoded error data C if there is available bandwidth;
   e) decoding the encoded data A to generate decoded data;
   f) decoding the encoded error data C to generate decoded error data; and
   g) generating the signal from the decoded data and the decoded error data.

4. A method for sending an encoded audio signal from a host station to a client station, the encoded signal including different types of data that are accorded different priorities, the method comprising the steps of:
   a) encoding audio data to generate encoded audio data A;
   b) generating user data B if a client request is received from the client station and according encoded audio data A a higher priority than user data B;

c) encoding error data from encoding audio data to generate encoded error data C and according user data B a higher priority than error data C;

d) transmitting the encoded audio data A;

e) if there is user data B and available bandwidth, transmitting user data B; and f) if there is available bandwidth, transmitting encoded error data C.

5. The method of claim 4 wherein the user data B is generated in response to a client request received at the host station from the client station.

6. The method of claim 5 wherein the client request comprises a request from the client station for a re-send of the encoded audio data A.

7. The method of claim 4, wherein the error data results only from encoding audio data.

8. A method for receiving an encoded audio signal from a host station at a client station, the encoded audio signal including different types of data that are accorded different priorities, the method comprising the steps of:

a) sending a client request for generating user data B if there is available bandwidth;

b) receiving encoded audio data A which is accorded a higher priority over user data B;

c) receiving and processing the user data B if there is user data B and available bandwidth, user data B being accorded a higher priority than error data C;

d) receiving encoded error data C if there is available bandwidth;

e) decoding the encoded audio data A to generate decoded audio data;

f) decoding the encoded error data C to generate decoded error data; and g) generating the audio signal from the decoded audio data and the decoded error data.

9. The method of claim 8 further comprising the step of sending a client request from the client station to the host station.

10. The method of claim 9 wherein the client request comprises a request from the client station for a re-send of the encoded audio data A.

11. The method of claim 8 wherein the user data B is generated by the host station in response to a client request sent by the client station to the host station.

12. A method for sending an audio signal between a host station and a client station, the encoded audio signal including different types of data that are accorded different priorities, the method comprising the steps of:

a) the host station encoding audio data to generate encoded audio data A;

b) the host station generating user data B if a request is received from the client station and according encoded audio data A a higher priority than user data B;

c) the host station encoding error data resulting from encoding data to generate encoded error data C and according user data B a higher priority than error data C;

d) the host station transmitting the encoded audio data A;

e) if there is user data B and available bandwidth, the host station transmitting user data B;

f) if there is available bandwidth, the host station transmitting the encoded error data C;

g) the client station receiving the encoded audio data A and the user data B;

h) the client station processing the user data B;

i) the client station decoding the encoded audio data A to generate decoded audio data;

j) the client station generating the audio signal from the decoded audio data.

13. A host station for sending an encoded audio signal to a client station, the encoded audio signal including different types of data that are accorded different priorities, host station comprising:

a first encoder for encoding audio data, the first encoder being arranged to generate encoded audio data A;

a processor for generating user data B and the host station configured to accord encoded audio data A a higher priority than user data B;

a second encoder for encoding the error data resulting from encoding audio data, the second encoder being arranged to generate encoded error data C, and the host station configured to accord user data B a higher priority than error data C; and a transmitter arranged:

a) to transmit encoded audio data A; then b) if there is user data B and available bandwidth, to transmit user data B; and then c) if there is available bandwidth, to transmit encoded error data C.

14. The host station of claim 13 wherein the processor is arranged to generate user data B in response to a client request received at the host station from the client station.

15. The host station of claim 14 further comprising a receiver for receiving client requests from the client station.

16. The host station of claim 14 wherein the client request comprises a request from the client station for a re-send of the encoded audio data A.

17. The method of claim 13, wherein the error data results only from encoding audio data.

* * * * *